Jan. 25, 1966    L. M. BLANCHETTE    3,231,040
REAR WHEEL SUSPENSION SYSTEM
Filed Aug. 16, 1963    5 Sheets-Sheet 3

INVENTOR.
LOUIS M. BLANCHETTE
BY *LeBlanc and Shur*
ATTORNEYS Jan. 25, 1966     L. M. BLANCHETTE     3,231,040
REAR WHEEL SUSPENSION SYSTEM
Filed Aug. 16, 1963     5 Sheets-Sheet 4

INVENTOR.
LOUIS M. BLANCHETTE
BY
*LeBlanc and Shur*
ATTORNEYS

Jan. 25, 1966  L. M. BLANCHETTE  3,231,040
REAR WHEEL SUSPENSION SYSTEM
Filed Aug. 16, 1963  5 Sheets-Sheet 5

INVENTOR.
LOUIS M. BLANCHETTE
BY
*LeBlanc and Shur*
ATTORNEYS

United States Patent Office 3,231,040
Patented Jan. 25, 1966

3,231,040
REAR WHEEL SUSPENSION SYSTEM
Louis M. Blanchette, Detroit, Mich., assignor to Colorado Oil and Gas Corporation, Denver, Colo., a corporation of Delaware
Filed Aug. 16, 1963, Ser. No. 302,546
38 Claims. (Cl. 180—73)

The present invention relates to a rear wheel suspension system for automotive vehicles in which each of the rear wheels is resiliently suspended for movement with respect to the frame of the auto.

In modern automobiles, the body, engine, running gear, accessories and other components are mounted on a generally rectangular frame on which the front and rear wheels are also suspended by means of front and rear wheel suspension systems designed to absorb road shock. As recognized in the automotive field, modern automobile front and rear suspension systems are respectively distinct in design and engineering, due to significant differences in load, operational, and functional requirements imposed on front and rear suspensions, respectively, when the vehicle is in service. For example, a front wheel suspension must be designed to carry a substantial part of the vehicle load and incorporate steering gear for turning the front wheels. On the other hand, in a conventional rear axle drive vehicle, the rear wheel suspension must suspend the rear axle and differential and take the brute force of the engine on startup and vehicle acceleration and the force of vehicle deceleration in sudden braking, with suitable compensation for the effect of resultant rear axle "wind-up" or wheel torque reaction on the rear universal joint and propeller shaft. Accordingly, there has been, and is, extensive activity in the design, engineering and development of front and rear wheel suspensions, respectively, by major companies in the automotive field.

A good rear wheel suspension system must satisfy a number of diverse requirements including, for example, the following: The suspension should absorb road shock and eliminate or minimize transfer of wheel impact to passengers; and the suspension should also eliminate or minimize transfer of road and engine noise to the passenger compartment. It is desirable for the suspension to provide a "soft ride." The suspension spring action preferably should yield readily at low load for small bumps, but should provide high reaction and small deflection for large bumps. Also, the suspension must suitably control rear axle wind-up and torque reaction during acceleration and deceleration to prevent resultant adverse effect on the rear universal joint and propeller shaft. In addition, the rear suspension should stabilize the body to minimize roll on curves; and it also should assure proper track of the rear wheels with respect to the frame. Further, the rear wheel suspension should have operating characteristics which provide a good ride under widely varying operating conditions encountered with modern autos, due to wide range of speeds which vary force of impact, differing road and off-the-road conditions, etc. Moreover, the suspension should be designed to permit ready adjustment at the factory after assembly, and in service, for proper universal joint angle, propeller joint angle, track and the like. On the other hand, the suspension should be as simple as possible for economy in production, and as compact as possible to save material and weight and avoid taking up undue space below the chassis, which is very limited and needed for other auto components. As known to those in this art, the above and other important diverse requirements and desirable characteristics of a good rear wheel suspension are difficult to achieve with a given design, since improvement with respect to one desirable characteristic often penalizes the suspension system with respect to one or more other desired features.

Thus, leading automotive manufactures have employed, and currently employ, different types of rear suspension systems. Two of the basic types of rear suspension systems in common use are the leaf spring type and the coil spring type, in numerous variations. Coil springs have replaced leaf springs in the front suspension of most modern automobiles, and in the rear suspension of many automobiles, because the longer coil springs provide a softer ride. However, when used in a rear suspension, coil springs have frequently required a tracking bar to keep the body from sliding sidewise. Torsion bars in the form of spring steel bars mounted so as to twist under load and return to original shape when load is removed have been used instead of leaf springs or coil springs in some applications, particularly for front wheel suspensions. Air suspension systems, including air suspension bellows in place of the springs at each wheel have also been used in modern automobiles in an attempt to improve on spring suspensions. To illustrate the degree of selectively between different types of rear suspension systems, one division of a major automotive manufacturer currently uses a four link and coil spring suspension system in which: (a) two relatively large and elongated lower control arms made of sheet metal stampings of "box" or channel-shaped cross section with radial type rubber bushings at their ends are connected by means of pins through the rubber bushings to a bracket on the frame and a bracket on the lower side of the rear axle housing; (b) two similar but shorter stamped upper control arms of channel cross section with radial rubber bushings at their ends are likewise connected by means of pins to a bracket on the upper side of the rear axle housing and a bracket on the frame; and (c) one each of a pair of coil springs is interposed between a pad on the upper side of each lower control arm and a seat on the frame. However, another division of the same major automotive manufacturer currently uses a different suspension system in which: (a) two relatively large and elongated lower control arms stamped from sheet metal into box or channel cross section with radial type rubber end bushings are connected to brackets on the lower side of the rear axle housing and the frame; (b) two similar but shorter stamped arms of box section with end radial rubber bushings are connected to brackets on the upper side of the axle housing and the frame; but (c) each of two coil springs is located near the wheel hubs between a pad on the top of the axle and a seat on the frame.

Such prior type current rear wheel suspensions have a number of shortcomings, however. For example, during manufacturing, the tolerances often result in displacement of the rear axle with respect to the propeller shaft so that the rear universal joint between propeller shaft and the differential is not properly centered for best angular movement, which may cause undesirable driveline vibrations resulting from severe universal joint velocity fluctuation during car motion. In prior designs, the only adjustment means provided to center the axle to overcome this problem is the use of shims between the suspension control arms and the frame, which is time consuming, costly, and not fully satisfactory. Also, prior systems merely provided adjustment of the rear axle and universal joint angle in a vertical plane, but did not provide means for adjusting the angle of the rear axle with respect to the frame in a horizontal plane to achieve (1) optimum horizontal angle of the universal joint, and (2) proper rear wheel track in the event the rear axle is at any excessive angle to the frame due to tolerances in manufacture and assembly. Similarly, prior rear suspension systems do not provide for complete fore and aft movement of the rear axle assembly for adjustment with respect to the frame and propeller shaft if that should prove necessary. In addition, the stamped channel shaped control arms of present suspensions are quite large in order to achieve desired functional characteristics under load, thereby taking up a lot of the limited space below the chassis. Further, such stamped control arms of channel cross section have functional characteristics under variable dynamic loading encountered in vehicle operation which limit successful utilization of such arms in a rear wheel suspension as springs or to control body roll and track, whereby supplemental components like tracking bars, or antisway bars, are often required. Also, the use of radial bushings, which are relatively costly, imposes a number of design limitations on such prior suspension systems. For example, the radial bushings have relatively little "give" and therefore are limited in shock absorption and noise absorption; they are not adjustable and do not permit variable positioning; and they do not have variable response under variable loading rates due to impact with small obstacles like tar strips as compared with impact with large obstacles like "chuck holes."

It is a primary objective of the present invention to provide novel and improved rear wheel suspension arrangements which overcome the above-discussed and other shortcomings of various prior type rear suspensions heretofore available and provide a number of important advantages from the viewpoint of improved performance, adjustability, lower production cost, simplified service, and other desirable factors as hereinafter amplified.

It is a principal object of this invention to provide a new, improved rear wheel suspension incorporating a plurality of upper and lower control arms which are in the form of rods or bars of circular or oval cross section made of so-called "wire" stock, to achieve a number of functional, production service and economic advantages made possible by the characteristics of such wire control arms. It is a related object of this invention to provide new improved rear wheel suspension systems incorporating wire control arms which have better spring and load characteristics compared to prior control arms (like stamped box or channel section arms), thereby achieving a rear wheel suspension improved in construction and performance. It is still another related object of this invention to provide an improved rear wheel suspension incorporating wire control rods which have greater functional versatility under varying load conditions, and therefore can serve (1) as springs to absorb impact, (2) as stabilizing bars to minimize body sway or roll, (3) as track bars for the rear axle so that the rear wheels track properly, (4) as compression and tension members to control wind-up and torque reaction, among other functions.

It is another object of this invention to provide a new, improved rear wheel suspension utilizing upper and lower wire control arms in cooperation with a coil spring interposed between the frame and the axle housing to achieve a rear wheel suspension system having much improved structural and performance characteristics compared to the prior rear suspension systems using stamped box section control arms. It is a related object of this invention to provide such a new improved coil spring rear wheel suspension system incorporating wire control arms in which the customary track and/or roll stabilizing bars may be eliminated, especially by use of wire control arms having properly oriented oval or like modified cross section to provide a higher moment of inertia which minimizes undesired displacement of the auto body with respect to the rear axle or vice versa.

It is still another principal object of this invention to provide a new, improved rear wheel suspension utilizing upper and lower wire suspension control arms which also serve as the main springs for the rear axle and wheels, thereby eliminating the coil or leaf springs and related components (pads or shackles, etc.) heretofore used in comparable rear suspension systems.

It is still another object of this invention to provide a new, improved rear wheel suspension system using wire control arms which provide the following additional advantages, among others: (1) they are less expensive to manufacture than prior type control arms, such as stamped box section arms; (2) they weigh much less than prior type control arms like stamped box section arms (e.g., weight saving is five or more pounds per car, with material cost savings of $1.00 or more per car); (3) they are much smaller than prior type control arms, thus taking up less space below the chassis, making room for other components and easing clearance problems; (e.g., a ¾ to 1 inch diameter arm may be used in lieu of a 2–3 inch box section stamped bar); (4) they can be loaded in tension, compression, and/or torque, and can be spring loaded as beams in virtually all directions, whereby a single member provides a variety of desirable performance characteristics with respect to impact, sway, roll, etc.; (5) they have more predictable performance characteristics and limits than stamped channel arms or the like, thus simplifying design and engineering to achieve desired functional characteristics such as optimum load-deflection ratio; and (6) they can be readily produced by known high production processes and equipment (e.g., coining, upset extrusion, etc.).

It is yet another object of this invention to provide a new improved rear wheel suspension incorporating wire control and spring arms which lend themselves to use with a variety of improved spool or axial type rubber bushings which eliminate the costly, restrained and nonversatile radial type bushings heretofore used in rear wheel suspensions, while providing a number of important advantages and improved results. It is a related object of this invention to provide a rear wheel suspension using wire control and spring arms in a new combination with variable-position axial spool type rubber bushings which permit adjustment of the control arms with respect to the frame, thereby providing simplified but accurate multiple adjustments of (1) vertical rear universal joint angle, (2) horizontal rear universal joint angle, (3) rear axle angle with respect to frame for proper wheel track, and (4) longitudinal position of the entire rear axle assembly with respect to the frame and the splined joint at the forward end of the propeller shaft. It is another related object to provide a rear wheel suspension with wire control arms in a new combination incorporating improved variable load axial or spool type rubber bushings which have a rate of deflection with respect to load that differs for different degrees of impact, with small or large bumps, thereby improving the ride of the vehicle. It is another related object to provide such new improved rear wheel suspension system wire suspension arms and axial or spool type rubber bushings which dampen and minimize transmission of road, engine and running gear noise to the passenger compartment.

It is yet another object of this invention to provide such new improved advantageous rear wheel suspension systems which may be varied in design particulars, dimensions, and the like, to meet different requirements of various auto models and sizes. It is another related object to provide such new improved rear wheel suspension systems with the above-discussed advantages in construction, operation and result which are competitive with other rear suspension systems so that the present invention can be exploited in its intended market.

Other objects and advantages of the present invention will be apparent from the following description thereof with reference to the accompanying drawings, and also from the appended claims. In the drawings:

FIGURE 14 is a side elevation view of one form of wire suspension arm and spring having circular cross section with reduced sections along its length for uniform stress distribution under load.

FIGURE 14A is a cross section view, along line 14A—14A in FIGURE 14, of the wire suspension arm and spring.

FIGURE 15 is a side elevation view of a wire control arm and spring which is coined or otherwise formed with a vertical oval section to increase the stress which may be applied to the arm vertically of the frame for improved control of body roll and/or rear axle wind-up.

FIGURE 15A is a sectional view along line 15A—15A in FIGURE 15.

FIGURE 17 is a side elevation and partial cross section view of one form of variable load-deflection axial or spool type rubber bushing which has a relatively high degree of yield under low load and a relatively low degree of yield under high load (being shown as a variable position type).

FIGURE 17A diagrammatically illustrates the variable load-deflection curve characteristic of the variable type rubber spool bushing shown in FIGURE 17.

FIGURE 18 is a side elevation and partly sectional view of another modified form of variable load-deflection axial or spool type rubber bushing (being shown as a fixed position type bushing).

FIGURE 18A illustrates the variable load-deflection curve characteristic of the variable bushing shown in FIGURE 18.

Figure 1:
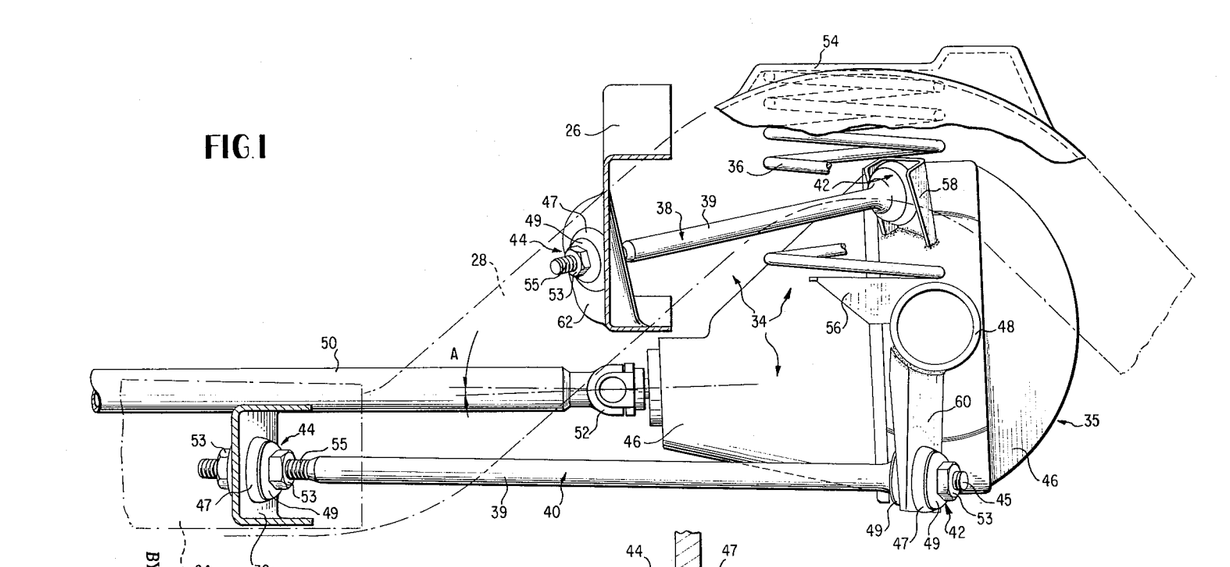
FIGURE 1 is a side elevation view of part of a rear wheel suspension utilizing coil springs between the frame and hub ends of the axle with two upper and two lower wire control arms having fixed position axial spool type bushings at one end and variable position axial spool type bushings at the other end.
Figures 2, 4:
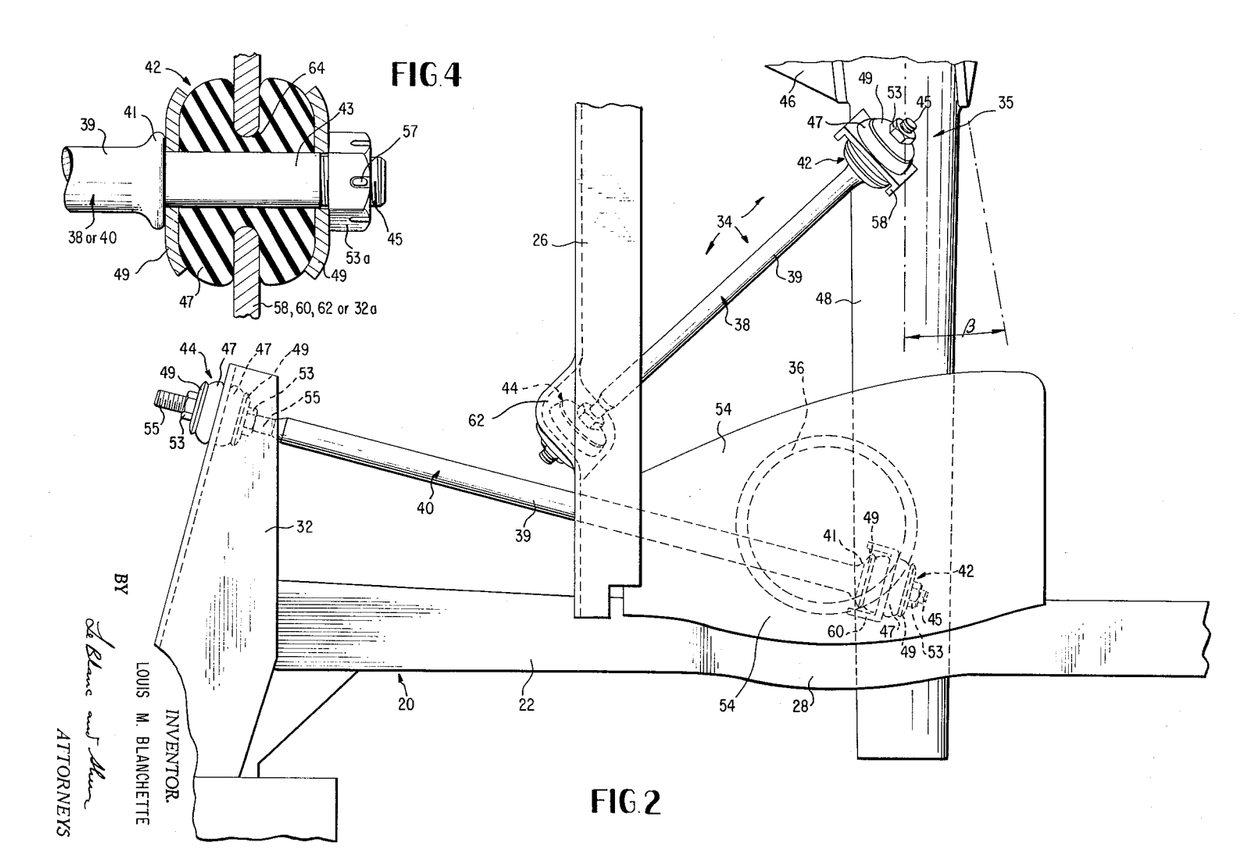
FIGURE 2 is a top plan view of one-half of a rear axle suspension such as shown in FIGURE 1 (FIGURE 6 showing, in a modification, the symmetric arrangement in top plan view of the control rods shown in FIGURE 2).
FIGURE 4 is a side elevation, partly sectional, detail view of a fixed position axial or spool type rubber bushing incorporated in the rear wheel suspension system of FIGURES 1 and 2.
Figure 5:
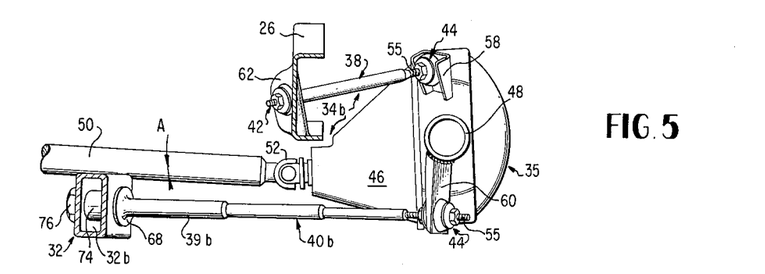
FIGURE 5 is a side elevation view of a modified form of rear wheel suspension incorporating two upper and two lower wire control arms with axial or spool type rubber bushings, but eliminating coil springs such as utilized in the embodiment of FIGURES 1 and 2.
Figure 6:
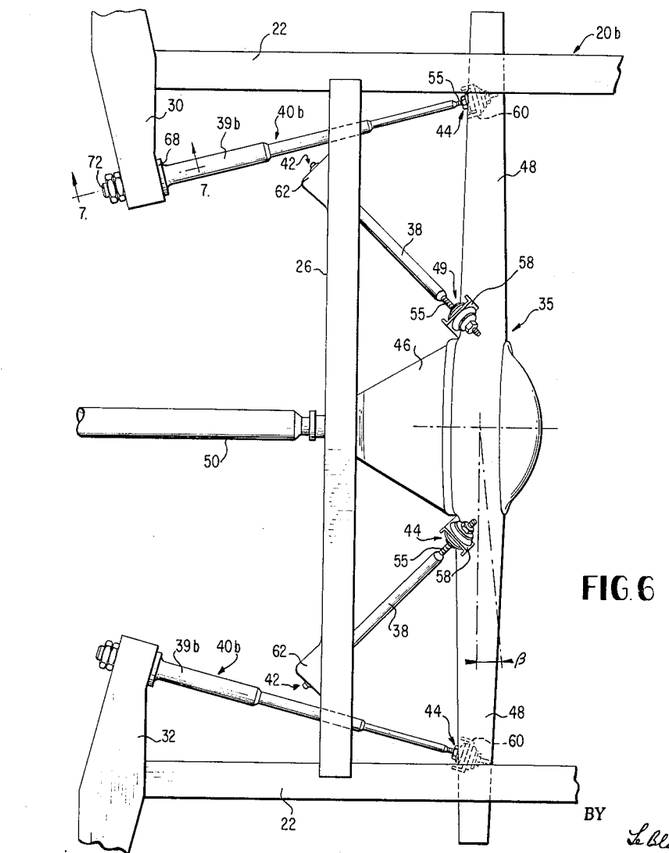
FIGURE 6 is a top plan view of the wire arm rear wheel suspension shown in FIGURE 5.

Referring to FIGURES 1, 2 and 6, there is shown an automobile frame generally indicated by numeral 20 comprising two elongated longitudinally extending side members 22 which are made of steel with hollow boxlike section, with a plurality of cross members or braces, such as shown at 26, welded or otherwise secured to the longitudinal frame side members 22, to keep the frame from twisting under impact or other load. The longitudinal frame side members 22 are usually curved to span the rear axle, as indicated in phantom at 28 in FIGURE 1. The illustrated frame 20 includes a pair of like laterally extending gussets 30 and 32 welded or otherwise secured to the elongated side frame members 22 and serving as bracket means. (In the embodiment of FIGURES 1–2, the gussets 30 and 32 are of channel shaped cross section as shown at 32a in FIGURE 1, whereas in the embodiment of FIGURES 5–7 the gussets 30 and 32 have hollow boxlike sections as shown at 32b in FIGURES 5 and 7, for reasons hereinafter amplified.)

FIGURES 1 and 2 show at 34 one embodiment of rear wheel suspension according to the present invention for a rear axle unit 35, comprising a pair of coil springs 36, a pair of upper wire control arms 38, and a pair of lower wire control arms 40, with fixed axial or spool type rubber bushings 42 and variable position axial or spool type rubber bushings 44. More particularly, the rear axle unit generally indicated at 35 is of rigid construction with a central differential unit 46 and laterally extending axle housings 48 in which the axles for the rear wheels are rotatably mounted in conventional manner. Power from the engine is transmitted through the differential 46 to the axles in housings 48 to drive the rear wheels (shown at 25 in FIGURE 13) by a propeller shaft 50 connected to the input of differential 46 by means of a rear universal joint 52, in conventional manner.

The upper end of each of the rear coil springs 36 is retained in a seat 54 formed in the longitudinal frame side members 22, and the lower end of each spring rides on one of a pair of spring pads 56 welded to the upper side of the rear axle housing 48 near the wheel hub. The upper end of springs 36 may be secured to the frame seat 54 by any suitable conventional means, such as a bolt-held clamp with insulator.

A pair of upper brackets 58 of channel or other suitable cross section are welded or otherwise suitably secured to the upper side of the rear axle housings 48 on opposite sides of the differential 46. A pair of similar lower brackets 60 are also welded or otherwise secured to the lower side of the rear axle housings 48 near the wheel hubs. The vertical depending side of the cross frame brace 26 is preferably stamped to provide two suitably oriented seats 62 for the forward ends of the upper wire control arms 38 and associated axial bushings 44. Each of the two upper and lower axle brackets 58 and 60, the two upper arm seats 62, and the webs 32a of the two gusset-bracket members 32 is provided with an annular aperture 64 (see e.g. FIGURES 3 and 4) for securing the forward ends of the upper and lower wire control arms 38 and 40 and their respectively associated axial spool type rubber bushings 42 and 44.

Figures 8, 9, 10, 10A, 11, 12, 13:
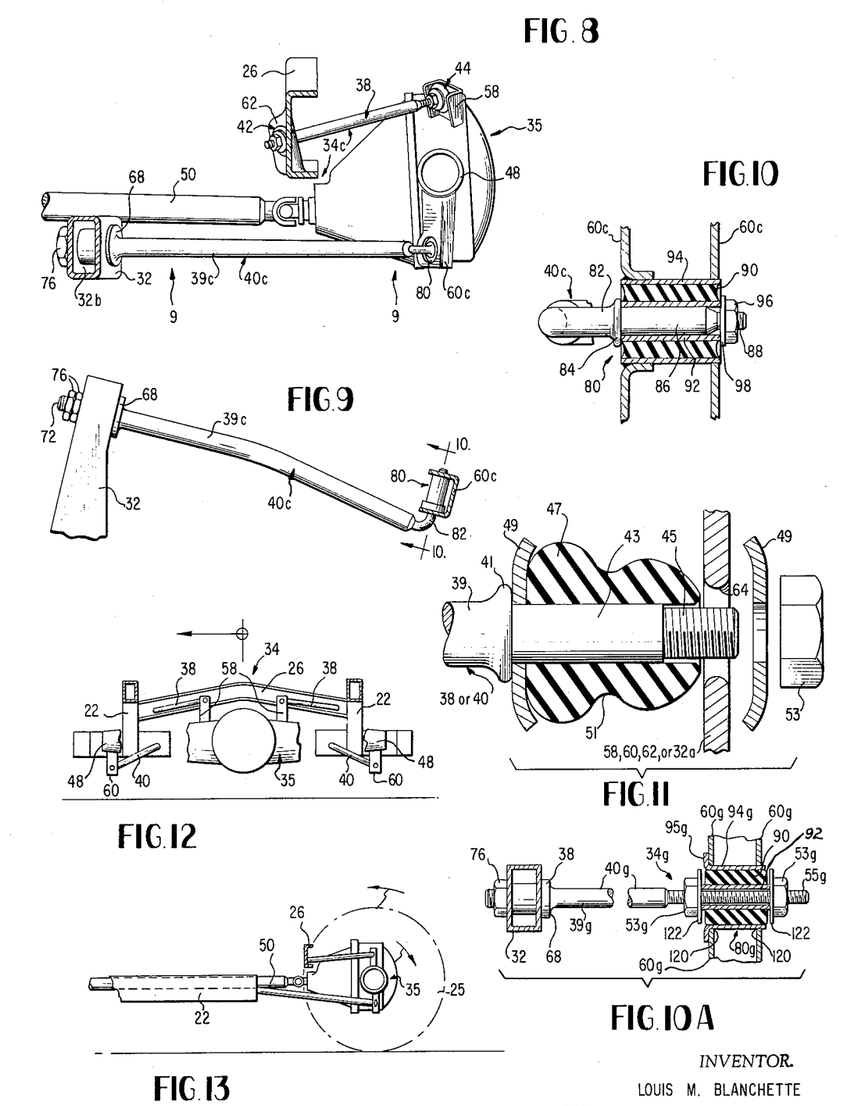
FIGURE 8 is a side elevation view of another modified form of suspension using four wire control and spring arms, without additional coil or other springs, similar to the embodiment of FIGURES 5–7, but using a radial type rubber bushing for the end of the lower suspension and spring arm connected to the lower rear axle bracket.
FIGURE 9 is a bottom plan view of one of the lower suspension-spring arms of the suspension system shown in FIGURE 8, looking upward along arrows 9—9 in FIGURE 8.
FIGURE 10 is a sectional view, along line 10—10 in FIGURE 9, illustrating in detail the radial bushing used in this suspension.
FIGURE 10A is a partial side elevation view of another modified form of suspension, similar to the embodiment of FIGURES 8–10, but using a different form of lower arm with radial type bushing.
FIGURE 11 is a side elevation, partially sectional, exploded view illustrating how a wire suspension arm with axial or spool type bushing utilized in the present invention is made and assembled in use.
FIGURE 12 is a somewhat diagrammatic end view of a rear suspension illustrating how the wire suspension arms-springs act also as stabilizers against body roll and as track bars.
FIGURE 13 is a diagrammatic side elevation view illustrating how the wire arms of the suspension system of this invention control and act as springs with respect to rear axle wind-up and wheel torque reaction.
Figure 16:
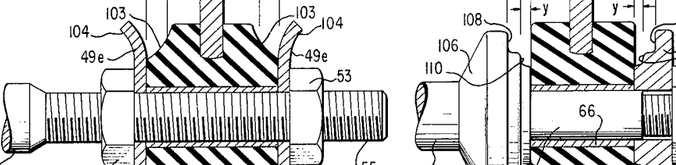
FIGURE 16 is a side elevation view of a wire suspension arm and spring similar to that of FIGURE 15, but with an oval cross section having the longer axis disposed horizontally of the frame, e.g., to eliminate need of a track bar.
Figure 16A:
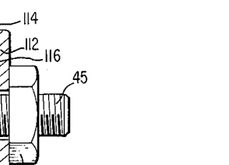
FIGURE 16A is a sectional view taken along line 16A—16A in FIGURE 16.

Particular reference is now made to FIGURES 4 and 16 which show in detail a fixed position axial spool type rubber bushing 42, such as used to connect the rearward ends of the upper and lower control arms 38 and 40 with rear axle brackets 58 and 60 in the FIGURES 1–2 embodiment. The main section 39 of control arm 38 or 40 constitutes cylindrical wire stock which is upset or otherwise suitably processed to form an enlarged collar 41, a reduced cylindrical rubber bushing seating portion 43, and an end section 45 which is subsequently threaded. Bushing 42 includes a rubber spool-like member 47 having an axial central aperture and a preassembled external configuration of suitable design to facilitate assembly, e.g., as shown in FIGURE 11, and spool member 47 is mounted on the cylindrical wire arm end section 43 between two retaining washers 49. As will be apparent, the rubber spool-like member 47 is pressed through aperture 64 of the associated metal component so that the annular groove 51 on the exterior of spool member 47 is within the aperture 64, and the bushing unit 42 is assembled by rotating the nut 53 (or 53a) until the rubber spool member 47 is compressed between washers 49 to a configuration such as shown in FIGURE 4. The nut 53 is locked in a predetermined position to compress the rubber bushing spool 47 to desired degree so that it is firmly secured but flexible, and any suitable commercial lock nut can be used to prevent undesired displacement of the nut due to vibration, etc. A nut 53a, as illustrated in FIGURE 4, may be used with a cotter pin 57 to provide a reference for securing the nut in the desired axial position on threaded section 45 of the wire control arm 38 or 40, as well as locking the nut against rotation and displacement. It is noted that the spool-like rubber bushing member 47 may be made of various materials like natural rubber, elastomers or other synthetic rubbers, and any other suitable flexible plastic material comparable to rubber, all of which are called "rubber" herein for convenience.

Figure 3:
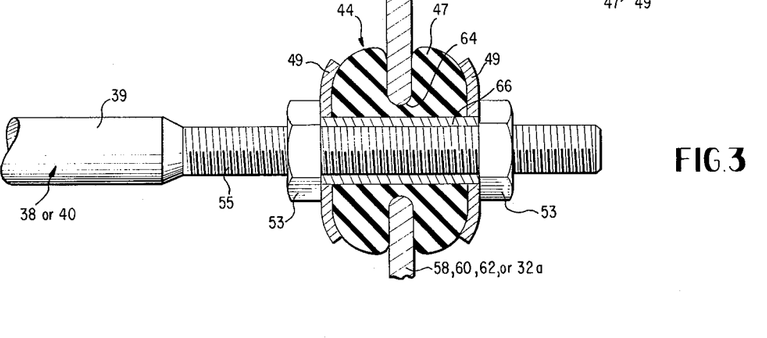
FIGURE 3 is a side elevation, partly sectional, detail view of a variable position axial or spool type rubber bushing incorporated in the rear wheel suspension system of FIGURES 1 and 2.

Reference is now made particularly to FIGURE 3 which shows in detail a variable position axial spool-type rubber bushing 44, such as used on the forward end of upper and lower wire control arms 38 and 40 in the embodiment of FIGURES 1–2. The main section 39 of the control arms 38 and 40 is of cylindrical wire stock, and the end portion is upset-extruded or otherwise processed to provide a sufficiently elongated end section 55 which is subsequently threaded. A rubber spool-like bushing member 47, which may be like that of fixed bushing 42 described with reference to FIGURES 4 and 11, is mounted on a hollow cylindrical sleeve 66 which is in turn mounted on the threaded end section 55 of the control arm 38 or 40. Sleeve 66 has an inside diameter of such size that it will seat and slide on section 55 without injuring the threads during use of adjustment of its longitudinal position. Sleeve 66 also is of suitable length so that a pair of lock nuts 53 may be tightened to sufficient extent to secure the flexible rubber spool 47 of axial bushing unit 44 in aperture 64 of such parts as axle brackets 58 and 60 or frame parts 62 and 32a. As will be apparent, the position of the wire control arms 38 and 40 with respect to frame 20 can be adjusted by turning the pair of nuts 53 to displace them on the threaded section 55 while maintaining the flexible spool 47 compressed as shown in FIGURE 3. This correspondingly displaces the associated axle bracket 58 or 60 connected to the other end of the wire control arm, thereby making possible certain desirable adjustments of the rear wheel suspension system 34, as hereinafter discussed.

Figure 7:
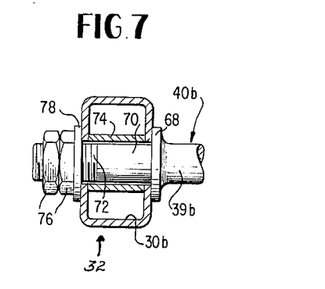
FIGURE 7 is a sectional view taken along line 7—7 in FIGURE 6 showing the cantilever mount connection to the chassis frame of the forward end of the lower wire spring control bar in the embodiment of FIGURES 5 and 6.

Reference is now made to FIGURES 5–7 showing a modified embodiment of rear end suspension indicated at 34b, which is generally similar to the embodiment of FIGURES 1–2, but omits the coil springs and utilizes the control arms as the spring means for the suspension system, with certain modifications of other components in view of that. For clarity, and to avoid unnecessary duplication in description, to the extent feasible, parts which are the same as corresponding parts in the embodiments of FIGURES 1–2 are identified with like numerals as in FIGURES 1–2, while modified parts similar to corresponding parts in FIGURES 1–2 are identified with like numerals as in FIGURES 1–2 plus the subscript b.

The frame 20b in the embodiment of FIGURES 5–7 is the same as the above-described frame 20 in the embodiment of FIGURES 1–2, excepting that the longitudinal side frame members 22 are not provided with coil spring seats (such as shown at 54 in FIGURES 1–2), since coil springs are not utilized in this particular suspension. Also, the gusset-brackets 30 and 32 are of box-like cross section as shown at 30b and 32b in FIGURES 5 and 7 (rather than being of channel section as shown at 32a in FIGURE 1) for the purpose of mounting the forward end of the modified lower wire control and spring arms 40b. The main section 39b of the lower arms 40b in this embodiment constitutes cylindrical wire stock which is upset or otherwise processed to form a collar 68, and a reduced section 70 having a subsequently threaded end section 72. Each of boxlike gusset-brackets 30 and 32 is provided with a sleeve 74 in which the end section 70 of each lower wire control and spring arm 40b is secured by means of lock nuts 76 and washer 78, whereby the lower control and spring wire arms 40b are fixedly cantilever mounted directly on a part of the metal frame 20b. The rearward ends of the lower control arms 40b are provided with variable position axial spool type bushings 44, such as shown in FIGURE 3, and these are secured in apertures in brackets 60 in like manner as discussed above with reference to FIGURES 1–3. It is noted that in addition to thus modifying the lower control-spring arms 40b, compared to arms 40 in FIGURES 1–2, the lower arms 40b in this embodiment have a stepped diameter configuration, such as shown particularly in FIGURES 14 and 14A, to provide a uniform stress distribution along the length of the arms 40b under load. For a suspension used on a vehicle of given design and size the base portion 69 of lower control arms 40b is usually greater than the diameter of lower arms 40 in the suspension embodiment of FIGURES 1–2 in view of the fact that in the FIGURES 5–7 suspension the lower control arms provide spring action in lieu of the coil springs used in the embodiment of FIGURES 1–2.

The rear suspension system 34b of FIGURES 5–7 also includes upper control arms 38 which are like the above-discussed upper control arms 38 of the embodiment in FIGURES 1–2, excepting that they are inverted lengthwise. That is, as shown in FIGURES 5 and 6, the end of each upper control arm 38 has a variable position bushing 44 such as shown in FIGURE 3 secured to one of the upper brackets 58 on the axle housings 48, whereas the other end of each upper control arm 38 has a fixed position bushing 42 such as shown in FIGURE 4 secured to apertures in seats 62 in frame cross bar 26.

The new improved rear suspension embodiments of FIGURES 1–2 and 5–7 incorporating upper and lower wire control and spring arms in combination with variable position axial spool type rubber bushings permit simplified multiple anjustment of the rear axle and related vehicle components. Referring to FIGURES 1–2 and to FIGURES 5–6, the vertical universal joint angle shown at A (alpha) may be adjusted by forward or rearward equal displacement of the two upper control arms 38 through adjustment of the variable position bushings 44 (which are in cross frame member 26 in the embodiment of FIGURES 1–2, and in axle brackets 58 in the embodiment of FIGURES 5–6), this being done by displacement of the two lock nuts 53 as explained above with reference to FIGURE 3. Further, it is possible to readily adjust the angle B (beta) of the rear axle with respect to the frame, to thereby achieve good track of the rear wheels and also proper horizontal universal joint angle. This is done by decreasing the length of one of the lower arms 40 or 40b and increasing the length of the other lower arm 40 or 40b by adjustment of the variable position bushings 44 (which are in gusset-bracket members 30 and 32 in the embodiment of FIGURES 1–2, and in lower axle brackets 60 in the embodiment of FIGURES 5–6). Moreover, by suitable adjustment of all four variable bushings 44 to correspondingly shorten or lengthen all four upper and lower control arms (38 and 40 or 40b), it is possible to longitudinally displace the entire rear axle assembly 35 with respect to the vehicle frame and the splined joint at the forward end of propeller shaft 50, if that should be necessary or desirable (e.g., when tolerances are exceeded in manufacture and/or assembly of the vehicle). It is noted that generally only one variable position bushing 44 such as shown in FIGURE 3 is used on each of the upper and lower wire control and spring arms 38 and 40 for reasons of economy, since the variable position axial type spool bushing of FIGURE 3 is more costly than the fixed position type axial spool bushing of FIGURE 4.

Reference is now made to FIGURES 8–10 showing another modified embodiment of rear end suspension generally indicated at 34c which is substantially similar to the embodiment of FIGURES 5–7 but utilizes radial type rubber bushings for the ends of the lower control and spring arms which are connected to the lower rear axle brackets. For clarity and to avoid duplicate description, parts in FIGURES 8–10 which are the same as corresponding parts in FIGURES 5–7 (and FIGURES 1–2) will be identified by like numerals, whereas modified parts similar to corresponding parts in FIGURES 5–7 are identified with like numerals plus the subscript c.

The suspension system 34c of this embodiment differs from the suspension 34b of the embodiment in FIGURES 5–7 in that the lower control and spring arm 40c has a modified configuration and rearward end adapted for connection with modified lower rear axle brackets 60c by means of radial type rubber bushings 80 (instead of using axial spool type bushings such as 42 or 44 of FIGURES 3 and 4). The main section 39c of the lower arm 40c constitutes cylindrical wire stock, with the forward end 68, 72 formed and mounted the same as in the embodiment of FIGURES 5–7. The main section 39c, however, is bent as shown in the plan view of FIGURE 9, and the rearward end 82 is reduced and bent at substantially right angles to the adjacent portion of arm section 39c. This end portion 82 is provided with an upset collar 84, a bushing seat section 86, and a threaded section 88. The radial bushing 80 is a suitable conventional commercially available type comprising a cylindrical flexible rubber bushing 90 interposed between and bonded to a pair of inner and outer metal cylindrical sleeves 92 and 94. Each lower axle bracket 60c is modified as shown in the drawings so that the radial bushing 80 may be seated in conventional manner, as by a press fit of outer bushing sleeve 94 within the bushing seating portions of the bracket 60c. The rearward end of lower arm 40c, with seat section 86 within the inner bushing sleeve 92, is retained by means of lock nut 96 and washer 98. In this suspension 34c, a pair of upper control arms 38 and a pair of lower control arms 40c are used, and they may be oriented with respect to the frame as shown in the plan view of FIGURE 6.

Reference is now made to FIGURE 10A showing another modified embodiment of rear end suspension 34g which is substantially similar to the embodiment of FIGURES 8–10 but utilizes a linear lower control and spring arm with a variable position radial type rubber bushing for connecting the rear end to the lower rear axle brackets. For clarity, and to avoid duplicate description, parts in FIGURE 10A which are the same as corresponding parts in FIGURES 8–10 (and FIGURES 1–2) are identified by like numerals, whereas modified parts similar to corresponding parts of FIGURES 8–10 are identified with like numerals plus the subscript g.

The suspension system of this embodiment differs from the suspension system 34c of the embodiment in FIGURES 8–10 in that the lower control and spring arm 40g has a main cylindrical section 39g and a threaded end portion 55g which are linear (instead of bent as are lower control arms 40c of FIGURES 8–10). The main section 39g of lower arm 40g constitutes cylindrical wire stock with its forward end 68, 72 formed and cantilever mounted on the frame bracket member 32 the same as in the embodiment of FIGURES 8–10 (and FIGURES 5–7). The threaded end 55g aligned with main section 39g has mounted on it a radial bushing 80g, seated in a modified form of lower axle brackets 60g of suitable conventional commercially available type. Bushing 80g comprises a cylindrical flexible rubber bushing 90 interposed between and bonded to a pair of inner and outer metal cylindrical sleeves 92 and 94g. Each lower axle bracket 60g of this embodiment is modified as shown in the drawing so that the radial bushing 80g may be seated in a conventional manner, as by a press fit of the outer bushing sleeve 94g within the bushing seating portion of the bracket 60g which is formed by two aligned cylindrical apertures 120 in opposed sides of bracket 60g. The forward end of the outer sleeve 94g has a shoulder 95g for engagement with one side of the lower axle bracket 60g.

The inner sleeve 92 of bushing 80g has an inner diameter of such size that it seats well and is slidable on threaded section 55g. Bushing 80g is held in desired position by means of a pair of nuts 53g and washers 122 abutting against the ends of inner sleeve 92. Thus, the axial bushing 80g may be displaced with respect to each of the lower control arms 40g, thereby displacing the axle with respect to the frame, for desired adjustment, as will be apparent from the disclosure herein.

The bushings 80g of this embodiment support vertical load radially as indicated in FIGURE 10A, and driving and stopping forces are absorbed in shear by rubber sleeve 90.

The suspension systems 34c of FIGURES 8–10 and 34g of FIGURE 10A are functionally similar to the suspension system of FIGURES 5–7 described above, but the radial type bushings 80 and 80g used on the lower arms 40c and 40g in suspensions of FIGURES 8–10 and FIGURE 10A respectively have the advantage of being able to carry higher vertical loadings, which is desirable when the suspension has no coil (or leaf) springs and relies on the wire control arms such as lower control arms 40c and 40g to serve as the springs for absorbing road shock. However, the embodiments of FIGURES 8–10 and FIGURE 10A incorporating radial rubber bushings 80 and 80g to connect the lower control arms to the lower axle brackets have certain disadvantages compared to the use of axial spool type bushings. For example: the axial spool bushings have more give for better absorption of shock and noise by the bushing to prevent transmittal to the passenger compartment; the axial bushings are less expensive; and axial bushings of modified form may be used to provide desirable variations in deflection under different loads (as hereinafter discussed with reference to FIGURES 17 and 18). Also, the axial spool type bushings provide for adjustment of the rear wheel suspension to obtain good rear wheel track and proper horizontal universal joint angle which is not possible with the arrangement of FIGURES 8–10. In the illustrated suspensions 34c and 34g, the upper control arms 38 are like the upper control arms 38 in FIGURES 5–7, with variable position bushings 44 such as shown in FIGURE 3 secured to upper axle brackets 58 and fixed position axial spool type bushing 42 such as shown in FIGURE 4 secured to cross frame member 26. This makes it possible to adjust the vertical universal joint angle through adjustment of the variable position axial spool-bushings 44 in upper brackets 58, in like manner as discussed above with reference to FIGURES 5–7.

In the rear wheel suspension embodiment of FIGURES 1 and 2, the coil springs 36 act to absorb the substantially vertical components of road shock. The upper and lower control arms 38 and 40 form the basic links of the rear wheel suspension. The control arms maintain the axle in line relative to the frame, and oppose torque reaction of the rear axle due to drive and brake loads. They also control rear axle windup. Referring to the diagrammatic illustration of FIGURE 13, when the vehicle is started up and accelerated, the rear axle 35 will wind up clockwise in FIGURE 13. This lifts the propeller shaft 50 and may cause it to interfere with the tunnel through the rear floor pan if wind-up is not suitably controlled. The upper control arm 38 is placed in tension and the lower control arm 40 is placed in compression, upon start up and acceleration, thereby controlling windup of the rear axle within suitable limits. On braking and deceleration of the vehicle, the torque reaction causes the axle 35 to rock counterclockwise in FIGURE 13, whereby the upper arm 38 is placed in compression and the lower arm 40 in tension to control the degree of axle rocking within desired limits for proper universal joint and propeller shaft angle. The foregoing discussion regarding the function of the upper and lower control arms is also applicable to the upper and lower control arms 38 and 40b or 40c in the respective embodiments of FIGURES 5–7 and 8–10; but, as will be apparent from earlier discussion, in the embodiments of FIGURES 5–7 and 8–10, respectively, the lower control arms 40b or 40c also serve as the springs for the rear suspension system.

The use of wire bars like 38, 40, 40b and 40c as rear wheel suspension control and spring arms provides an improved rear wheel suspension because such wire rods have greater functional versatility under varying load conditions. For example: wire control arms 38, 40, 40b and 40c serve better as compression and tension members to control windup and torque reaction in that they act as springs; they also function as torsion and/or spring arms to serve as stabilizing bars which minimize body sway and roll, and serve also as track bars for the rear axle; and they serve as springs supplementing, or in lieu of coil or other springs used in rear suspensions. FIGURE 12 diagrammatically illustrates the stabilizing functions of the suspension control and spring arms 38 and 40 to minimize body sway or roll, and control track. FIGURE 12 illustrates the suspension system when the vehicle is turning on a curve so that centrifugal force is applied through the center of gravity to tilt the body counterclockwise, in which case the control arms 38 and 40 on the right side of the vehicle in FIGURE 12 are bent upward in tension while control arms 38 and 40 on the left side of the vehicle in FIGURE 12 are bent downward, so that both sets of arms provide cumulative forces tending to prevent the vehicle body from rolling or swaying with respect to the rear axle and wheels and tending also to return the body to normal position, whereby stabilizing the vehicle. Since the wire rod control arms 38, 40, 40b and 40c have spring characteristics which tend to return them to their neutral unstressed position, one or more of these arms will serve as track bar(s) for the rear axle to make the rear wheels track properly. Since a wire rod control arm can be loaded in tension, compression, torque, and as a resilient beam in virtually all directions, a wire control arm provides a variety of desirable performance characteristics with respect to spring reaction on impact, sway, roll, etc., thereby providing superior rear suspension performance. Also such wire control rods have more predictable performance characteristics and limits than other types of control arms such as stamped channel or boxlike arms, thus simplifying design and engineering to achieve desired functional suspension characteristics such as discussed herein. Further, such wire control rods can readily be produced by known high production processes and equipment, e.g., coining upset-extrusion, etc.; and they also can be readily modified to provide desired special characteristics as will now be amplified with respect to FIGURES 14–16.

Referring particularly to FIGURE 14, this shows in enlarged side elevation one of the lower control arms 40b having circular cross section as illustrated in FIGURE 14A, for use in the embodiment of FIGURES 5–7, in which coil or other springs are omitted, with the lower suspension arms 40b serving as the springs as well as lower control bars. A round bar which is cantilever mounted at one end, like lower control and suspension arms 40b in FIGURES 5–7, has load characteristics whereby there is a decrease of stress along the length of the arm at increasing distances from the fixed end of the arm. Accordingly, it is possible to make the lower control and spring arms 40b in stepped form with reduced diameter sections at different portions of its length from the mounted end 70, with uniform distribution of stress along the length of the bar, while saving material. Thus, a control arm having a configuration like arm 40b in FIGURES 14 and 14A may be readily formed from a piece of wire stock of a standard diameter, by means of known processes and equipment, such as upset extrusion. Use of stepped arms of round cross sections like bar 40b in FIGURES 14 and 14A is preferable when the lower suspension arms serve as the suspension springs, without additional coil or other springs, in the embodiment of FIGURES 5–7.

Referring particularly to FIGURES 15, 15A, 16 and 16A, there is shown a wire rod suspension control and spring arm 40d which is made in stepped form from standard round wire stock, similar to arm 40b of FIGURES 14–14A, but is then coined or otherwise processed to give it an oval cross section as shown in these figures. The oval cross section provides a higher moment of inertia in the direction of the longer axis of the oval, thereby resulting in greater resistance to bending around this axis. Thus, a control arm with oval cross section may be mounted with the longer axis vertical with reference to the vehicle, as shown in FIGURES 15 and 15A, thereby providing better control of body roll and rear axle windup and torque reaction. However, the control and spring arm 40d of these figures can be mounted at 90 degrees to the orientation shown in FIGURES 16 and 16A, thereby providing a higher moment of inertia in the horizontal plane which affords better resistance to yaw of the body with respect to the axle 35 and also serves to eliminate need for a tracking bar in the rear wheel suspension system.

Another form of wire rod control and spring arm for my rear wheel suspension system may be made from standard round wire stock which is formed as shown in FIGURES 1–2, or with a cantilever counting end as at 68, 72 in FIGURES 5–7, then has its main round portion coined or otherwise processed to give it an oval cross section of uniform area along its length. The oval cross section provides a higher moment of inertia in the direction of the longer axis of the oval, whereby the control arm can be oriented with the longer oval axis disposed vertically or horizontally to obtain better control of body roll and rear axle tilt or track, as discussed above in greater detail with reference to FIGURES 15, 15A, 16 and 16A. This variation eliminates the step forming of the cylindrical wire stock as in the arm of FIGURES 15, 15A, 16 and 16A.

The upper and lower control arms 38, 40b, 40d and 100 are formed of suitable length and diameter, with appropriate cross sectional area, based on such factors as the size of the vehicle, loads imposed, forces due to acceleration and deceleration, impact loads under extremes, and other like factors, based on the type of information used by those in the art in the resign of prior and current rear suspension systems. The lower control arms, for example, are formed from wire stock of a diameter providing suitable cross section area according to the material used so as to provide a desirable ratio of control arm deflection, in inches, for each hundred pounds of weight imposed on the arm. In the case of my new suspension systems in which the lower control bars function as the springs without coil or other additional springs, the arms are designed for appropriate spring reaction under impact. Also, the arms are designed with proper dimensions and suitable cross section so that they have a natural frequency within acceptable values for expected load conditions; this is determined empirically in a manner which will be apparent to those in this art in light of the present disclosure.

For purposes of illustration, in a system such as shown in FIGURES 1 and 2, for a so-called medium size U.S.-made automobile: the upper arm may be about 12½–13¼ inches long between mounted ends, and about ¾ of an inch in diameter, when made of C1018 type steel without special heat treatment; and the lower arm of C1018 type steel may be 18–22 inches long between end mounts, with a diameter of about 0.75 to 0.87 inch. Where no additional coil or other type springs are used, as in the new improved suspension of FIGURES 5–7, lower control arms of cylindrical form may be 18–22 inches long and have a diameter in the order of 1 inch when made of C8640 type steel with suitable heat treatment to increase allowable working stress. When the lower control arms are of stepped form, such as shown in FIGURE 14, for use in the embodiment of FIGURES 5–7, the base portion $39b$ of lower control arm $40b$ would be approximately 1 inch in diameter. Other portions of control arms 38, 40, $40b$ and $40c$ are varied in dimension consistent with the showing in the drawings to provide the proper stress characteristics for meeting the load conditions which will be imposed during vehicle operation, in a manner which will be apparent to those in the art in light of the disclosure herein. The dimensions of control arms having oval cross section are similarly determined, with due account for difference in moment of inertia about major and minor cross section axes, as will be apparent to those in the art in light of the disclosure herein.

Reference is now made to FIGURES 17 and 18 which show two forms of variable load deflection axial spool-type rubber bushings which have a relatively high degree of yield and deflection under low load conditions, and lower degree of yield under high load or impact conditions.

Referring particularly to FIGURE 17, there is shown at $44e$ one form of variable load deflection axial spool-type bushing illustrated as a variable position type, like that of FIGURE 3, although it may also be made as a fixed position type like that of FIGURE 4. For clarity, and to avoid undue duplicate description, corresponding parts in bushing $44e$ of FIGURE 17 are identified with like numerals as in FIGURE 3, and corresponding modified parts are identified with like numerals as in FIGURE 3 plus the subscript $e$, to the extent feasible.

The axial bushing unit $44e$ comprises a rubber spool-like bushing member $47e$ which is mounted on a hollow cylindrical sleeve 66 having an inside diameter of such size that it will seat and slide on threaded section 55 of the control and spring arm 38 or 40 without injuring the threads during use or adjustment of its longitudinal position. The sleeve 66 also is of suitable length so that a pair of lock nuts 53 may be tightened against the sleeve ends to compress the rubber bushing spool $47e$ to the desired extent between a pair of washers $49e$ abutting against the ends of sleeve 66 and secure the flexible rubber spool $47e$ of bushing unit $44e$ in aperture 64 of such parts as axle brackets 58 and 60 or frame parts 62 and $32a$. It will be noted from FIGURE 17 that both ends of rubber bushing $47e$ are provided with relatively large annular concave corners 103, while the ends of annular washers $49e$ are bent outwardly as shown at 104. This leaves room for relatively easy displacement of part of rubber bushing $47e$ into the space indicated at 103 when the control arm 38 or 40 is displaced under impact with respect to the frame portion or axle bracket for an initial distance indicated at $x$ in FIGURE 17. Thus, referring to FIGURE 17A, the bushing $44e$ of FIGURE 17 has a variable load/deflection characteristic curve, whereby there is a relatively large deflection of the rubber bushing $44e$ with respect to the frame or axle bracket under low impact load, as for small bumps; then there is a relatively high force reaction with low bushing deflection for high impact, as for large bumps, because in the latter case the space provided for relatively large initial distortion and deflection of the rubber bushing spool $47e$ has been occupied. A principal result of this improved construction is to eliminate or minimize transfer to the frame and passenger compartment of small amplitude bumps such as when the wheels hit tar strips or expansion joints between concrete slabs, while still providing a high force reaction for large bumps so that the suspension system has a tendency to return quickly to normal under large impact.

Reference is now made to FIGURE 18 which shows another form of variable load/deflection bushing $44f$, illustrated as a fixed position type analogous to that of FIGURE 4, although it can be a variable position type like that of FIGURE 4. For clarity and to avoid undue repeat description, parts which are the same as parts in FIGURE 4 are identified with like numerals as in FIGURE 4, whereas modified parts corresponding to components of the bushing unit in FIGURE 4 are identified with like numerals plus the subscript $f$, to the extent feasible.

The control arm 38 or 40 is provided with a reduced section $43f$ and also with a first collar 106 having a pair of steps 108 and 110. Collar 106 may either be formed as an integral part of the arm 38 or 40, or as a separate collar inserted over arm section $43f$, as will be apparent to those skilled in the art in light of the disclosure herein. A rubber spool-like bushing member $47f$ is mounted on a hollow cylindrical sleeve 66 disposed on arm section $43f$, on which there is also removably mounted another collar 112 having steps 114 and 116 which are like steps 108 and 110 in collar 106. The sleeve 66 is of suitable length so that a lock nut 53 may be tightened on the threaded end section 45 of the arm 38 or 40 to sufficient extent to suitably compress flexible rubber spool $47f$ and secure it in the aperture 64 of axle brackets 58 and 60 or frame parts 62 and $32a$, as shown particularly in FIGURE 18. The steps 110 and 108 on the inside of collar 106 and steps 116 and 114 on the inside of collar 112 permit the material of the rubber bushing spool $47f$ to be initially distorted and displaced more readily when the control arm 38 or 40 is moved with respect to the supporting frame parts or axle brackets, to provide a relatively large deflection at relatively low and intermediate impact, with a smaller deflection and increased force reaction for higher impact loads. Thus, referring particularly to FIGURE 18A, the bushing unit $44f$ of FIGURE 18 has a variable load/deflection characteristic curve so that the control arm 38 or 40 is readily displaced with respect to the frame or axle bracket the distance $y$ at relatively low impact load, and then will be displaced with somewhat greater resistance the additional distance $z$ under intermediate load. Thereafter, further displacement of the bushing unit $44f$ with respect to the frame or axle brackets requires a much higher force. Thus, with the variable load deflection bushing $44f$ of FIGURE 18, small or intermediate amplitude bumps result in a relatively large deflecting of the bushing, with relatively low reaction, so that transfer of the impact force of such bumps to the body and passenger compartment is minimized. But, when high impact causes deflection of arm 38 or 40 with respect to the corresponding frame or axle part exceeds the sum of distance $y$ plus $z$, there is a relatively high force reaction causing the suspension system to quickly return to normal position.

Accordingly, the present invention provides a new rear wheel suspension with wire control arms in a new combination with improved variable load/deflection axial spool-type rubber bushings which have a rate of deflection with respect to load which differs for varying impact with large or small bumps, thereby improving the ride of the vehicle. It will also be apparent from the foregoing that the present invention provides a new improved rear wheel suspension system with wire control and spring arms in combination with axial spool-type rubber bushings so as to dampen and minimize transmission of road, engine and running gear noise to the passenger compartment, as well as eliminating or minimizing transfer of road shock.

It will also be apparent from the foregoing that the present invention readily lends itself to variation in design particulars, such as dimensions and the like, to meet different requirements for various auto models and sizes, and which also takes up very little space compared to some prior and current rear wheel suspension systems. It is noted that the upper and lower control arms 38 and 40 or 40b or 40c may be oriented differently in plan than as shown in FIGURES 2 and 6, as will be apparent to those in the art in light of the disclosure herein.

It will further be apparent from the foregoing description that the present invention accomplishes the various objectives and advantages referred to earlier in this application.

Claim definition: The term "resilient bushing means" or "resilient bushing" or "annular resilient buffer means" or like terminology used in the claims means a bushing which has resilient action permitting movement under load conditions, without significant movement under non-load conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A rear wheel suspension system for a vehicle having a body frame and rear wheel axle including a housing comprising: at least two lower rod type control arms, each having a first portion resiliently connected to part of said frame and a second portion resiliently connected to a lower part of the axle housing, with each of said arms being located on opposite sides of the axle's center line; at least one rod type upper control arm having a first portion resiliently connected to part of said frame and a second portion resiliently connected to an upper part of said axle housing; each of said lower and upper rod type control arms having mounted on one end thereof an annular resilient buffer means which is secured to the axle housing, with a portion of the associated rod type control arm extending through said annular buffer means in the direction of the rod axis, thereby loading said annular buffer means in the direction of the longitudinal axis of the buffer means, with an axially loaded annular resilient buffer means also being mounted on the other end of each of said lower and upper rod type control arms and secured to an apertured portion of the frame; at least one pair of said axially loaded annular resilient buffer means on the end of one pair of control arms being of a variable position type and including means for displacing the associated portion of the control arm axially with respect to said buffer means, thus displacing part of the axle with respect to the frame.

2. A rear wheel suspension system for a vehicle as defined in claim 1, further comprising: spring means interposed between said frame and said axle for absorption of impact.

3. A rear wheel suspension system for a vehicle as defined in claim 1, wherein each of said annular resilient buffer means is a unitary axial spool type rubber bushing.

4. A rear wheel suspension system for a vehicle as defined in claim 1, further comprising coil spring means bearing against part of said body frame for absorbing impact force imposed on the rear wheel axle.

5. A rear wheel suspension as defined in claim 1 wherein said axle housing is provided with at least one upper and two lower members having apertures therein, with each of said lower and upper rod type control arms having mounted on one end thereof said annular resilient buffer means which are each secured in one of said apertured axle members for resiliently connecting said ends of each of said lower and upper control arms to said axle housing.

6. A rear wheel suspension system as defined in claim 5 wherein portions of said frame are provided with apertures with an annular resilient buffer means being mounted on the other end of each of said lower and upper control arms and secured in said apertured portions of the frame for resiliently connecting said other end of the control arms to the frame.

7. A rear wheel suspension system for a vehicle as defined in claim 6 wherein each annular resilient buffer means on the end of said lower control arms connected to said axle members is a variable position type including means for displacing the associated control arm with respect to the annular buffer means thus displacing part of the axle with respect to the frame.

8. A rear wheel suspension system for a vehicle as defined in claim 6 wherein each annular resilient buffer means on the end of said lower control arms connected to said frame portions is a variable position type including means for displacing the associated control arm with respect to the annular buffer means and thus displacing part of the axle with respect to the frame.

9. A rear wheel suspension system for a vehicle as defined in claim 7, wherein fixed position annular buffer means are mounted on the other end of each of said lower and upper rod type control arms connected to portions of the frame.

10. A rear wheel suspension system for a vehicle as defined in claim 8 wherein fixed position annular resilient buffer means are mounted on the other ends of each of said lower and upper rod type control arms connected to said axle members.

11. A rear wheel suspension system for a vehicle as defined in claim 1, comprising: a pair of upper rod type control arms with annular resilient buffer means mounted on opposite ends of each of said upper control arms and secured to part of the axle housing and a portion of the frame, on opposite sides of the axle's center line; each of said annular resilient buffer means on the end of each of said upper control arms connected to said axle housing being a variable position type including means for displacing the associated control arm with respect to the buffer means and thus displacing part of the axle with respect to the frame.

12. A rear wheel suspension system for a vehicle as defined in claim 11, comprising: a pair of upper rod type control arms with an annular resilient buffer means mounted on opposite ends of each of said upper control arms and secured to an apertured axle member and an apertured portion of the frame, on opposite sides of the axle's center line; each of said annular resilient buffer means connecting the ends of each upper control arm to said apertured frame portions being a variable position type buffer means including means for displacing the associated control arm with respect to the bushing and thus displacing part of the axle with respect to the frame.

13. A rear wheel suspension system as defined in claim 1 wherein one of said annular resilient buffer means on one end of each of said lower control arms is a variable load-deflection type bushing comprising a rubber spool-like component and means for causing said rubber spool-like component initially to yield readily upon displacement of the control arm associated therewith due to relatively small impact force on the suspension system and thereafter to yield with greater resistance to further displacement of said control arm when greater impact force is imposed on the suspension system.

14. A rear wheel suspension system as defined in claim 11 wherein one of said annular resilient buffer means on one end of each upper control arm is a variable load-deflection type bushing comprising a rubber spool-like component and means for causing said rubber spool-like component initially to yield readily upon displacement of the control arm associated therewith due to relatively small impact force on the suspension system and thereafter to yield with greater resistance to further displacement of said control arm when greater impact force is imposed on the suspension system.

15. A rear wheel suspension system as defined in claim 13 wherein each of said variable load-deflection annular resilient buffer means comprises: a spool-like rubber component on said control arm and collars on said control arm on opposite sides of said spool-like rubber component, with a peripheral spacing between peripheral portions of said rubber spool-like component and adjacent portions of said collars when the axial bushing is in normal position so that a portion of said rubber spool-like component may be initially readily distorted into said spacing when said arm is displaced by a relatively small impact force on the suspension system, with greater resistance to further yielding of said rubber spool-like components and displacement of the control arm associated therewith when a higher impact force is imposed on the suspension system.

16. A rear wheel suspension system with variable load-deflection annular resilient buffer means as defined in claim 15 wherein the inside part of each of said collars adjacent said spool-like rubber bushing component has at least one peripheral step-like recess which provides said spacing between the peripheral portions of rubber spool-like component and each of said collars.

17. A rear wheel suspension system as defined in claim 16 wherein the inside part of each of said collars has at least a first and second peripheral step-like recess which provides spacing between said collars and adjacent portions of said rubber spool-like bushing component so that part of the rubber component may initially readily yield and distort into the spacing provided by the first step-like recess in said collars when said arm is displaced due to relatively small impact force on the suspension system, and then will further distort and yield with intermediate resistance when said control arm is further displaced due to intermediate impact forces on the suspension system, and thereafter will yield with high resistance against further displacement of said control arm due to higher impact forces on the suspension system.

18. A rear wheel suspension system with variable load-deflection annular resilient buffer means as defined in claim 15 wherein peripheral portions of said collars are bent away from adjacent portions of the associated rubber spool-like component which has concave peripheral recesses on each side thereof, thus providing said peripheral spacing into which portions of said spool-like component may be initially readily distorted.

19. A rear wheel suspension system as defined in claim 1, wherein each of said lower control arms includes a plurality of stepped sections along its length, each of said sections having a different cross-sectional area.

20. A rear wheel suspension system as defined in claim 19, wherein each of said stepped sections has a substantially circular cross section.

21. A rear wheel suspension as defined in claim 1, wherein at least one of said upper and lower control arms has a substantially oval cross section.

22. A rear wheel suspension system as defined in claim 1, wherein at least one of said upper and lower control arms has a substantially oval cross section with the major axis thereof disposed substantially horizontally with respect to the vehicle frame.

23. A rear wheel suspension system as defined in claim 1, wherein at least one of said upper and lower control arms has a substantially oval cross section with the major axis thereof disposed substantially vertically with respect to the vehicle frame.

24. A rear wheel suspension system for a vehicle having a body frame and rear wheel axle housing including a housing comprising: at least two lower rod type control arms, each having a first portion connected to part of said frame and a second portion connected to a lower part of the axle housing by resilient bushing means, with each of said arms extending longitudinally of the frame on opposite sides of the axle's center line; at least two rod type upper control arms extending longitudinally of the frame on opposite sides of the axle's center line; each of said upper control arms having a first portion connected to part of said frame by means of a resilient bushing and a second portion connected to an upper part of said axle housing by resilient bushing means; the first portion of each of said lower rod type control arms being cantilever mounted on and secured directly to part of said frame.

25. A rear wheel suspension as defined in claim 24, wherein said axle housing is provided with at least two upper and two lower members having apertures therein, with each of said lower and upper rod type control arms being substantially linear and having mounted on one end thereof an axial type resilient rubber bushing unit part of which is also secured in one of said apertured axle members for resiliently connecting said second portions of each of said lower and upper control arms to said axle housing.

26. A rear wheel suspension system as defined in claim 25, wherein portions of said frame are provided with apertures, and an axial type resilient rubber bushing unit is mounted on the other end of each of said upper control arms with a part of said bushing unit secured in said apertured portions of the frame for resiliently connecting said first portions of the upper control arms to the frame.

27. A rear wheel suspension system for a vehicle as defined in claim 25 wherein each axial type rubber bushing unit on the end of said lower control arms connected to said axle members is a variable position type bushing unit including means for displacing the associated lower control arm with respect to the bushing unit thus displacing part of the axle with respect to the frame.

28. A rear wheel suspension system for a vehicle as defined in claim 25, wherein each axial type rubber bushing unit on the end of said upper control arms connected to said axle members is a variable position type bushing unit including means for displacing the associated upper control arm with respect to the bushing unit and thus displacing part of the axle with respect to the frame.

29. A rear wheel suspension system as defined in claim 25, wherein each of said axial type rubber bushing units on at least one pair of ends of said upper and lower control arms is a variable load-deflection type bushing unit comprising a rubber spool-like component initially to yield readily upon displacement of the lower control arm associated therewith due to relatively small force imposed on the suspension system and thereafter to yield with greater resistance to further displacement of said control arm when greater force is imposed on the suspension system.

30. A rear wheel suspension system for a vehicle as defined in claim 26, wherein fixed position axial type rubber bushing units are mounted on said other end of each of said upper rod type control arms for connecting said first portions of said arms to the frame.

31. A rear wheel suspension system for a vehicle as defined in claim 26, wherein: each of said axial type rubber bushing units connecting the ends of each upper control arm to said apertured frame portions is a variable position type bushing unit including means for displacing the associated upper control arm with respect to the bushing unit and thus displacing part of the axle with respect to the frame.

32. A rear wheel suspension system as defined in claim 26, wherein said axial type bushing units on one end of each of said upper and lower control arms is a variable load-deflection type bushing unit comprising a rubber spool-like component initially to yield readily upon displacement of the control arm associated therewith due to relatively small force imposed on the suspension system and thereafter to yield with greater resistance to further displacement of said control arm when greater force is imposed on the suspension system.

33. A rear wheel suspension system as defined in claim 29, wherein each of said variable load-deflection axial type spool bushing units comprises: a spool-like rubber component on each said control arm and collars on each said control arm on opposite sides of said spool-like rubber component, with a peripheral spacing between peripheral portions of said rubber spool-like component and adjacent portions of said collars when the axial bushing is in normal position so that a portion of said rubber spool-like component may be initially readily distorted into said spacing when said arm is displaced by a relatively small force imposed on the suspension system, with greater resistance to further yielding of said rubber spool-like component and displacement of said control arm when a higher force is imposed on the suspension system.

34. A rear wheel suspension system with variable load-deflection axial type bushing units as defined in claim 33 wherein the inside part of each of said collars adjacent each said spool-like rubber bushing component has at least one peripheral step-like recess which provides said spacing between the peripheral portions of said rubber spool-like component and each of said collars.

35. A rear wheel suspension system with variable load-deflection axial type bushing units as defined in claim 33, wheerin peripheral portions of said collars are bent away from adjacent portions of the associated rubber spool-like component which has concave peripheral recesses on each side thereof, thus providing said peripheral spacing into which portions of said spool-like component may be initially readily distorted.

36. A rear wheel suspension system as defined in claim 34 wherein the inside part of each of said collars has at least a first and second peripheral step-like recess which provides spacing between said collars and adjacent portions of said rubber spool-like bushing component so that part of the rubber component may initially readily yield and distort into the spacing provided by the first step-like recess in said collars when said arm is displaced due to relatively small force imposed on the suspension system, and then will further distort and yield with intermediate resistance when said control arm is further displaced due to intermediate force imposed on the suspension system, and thereafter will yield with high resistance against further displacement of said control arm due to higher force imposed on the suspension system.

37. A rear wheel suspension system as defined in claim 24, wherein each of said lower control arms includes a plurality of stepped sections along its length, each of said sections having a different cross-sectional area.

38. A rear wheel suspension system as defined in claim 37, wherein each of said stepped sections has a substantially circular cross section.

References Cited by the Examiner

UNITED STATES PATENTS

| | | | |
|---|---|---|---|
| 1,561,083 | 11/1925 | Kettering | 280—106.5 |
| 1,705,705 | 3/1929 | Barthel | 280—106.5 |
| 2,246,821 | 6/1941 | Utz | 180—73 X |
| 2,300,844 | 11/1942 | Olley | 180—73 |
| 2,323,007 | 6/1943 | Borgward | 267—20 X |
| 2,888,271 | 5/1959 | Butterfield | 280—124 |
| 2,927,786 | 3/1960 | Templeton | 267—8 |
| 3,024,040 | 3/1962 | Muller | 280—106.5 |
| 3,079,139 | 2/1963 | Greene et al. | 267—47 |

BENJAMIN HERSH, *Primary Examiner.*

A. HARRY LEVY, PHILIP ARNOLD, *Examiners.*